United States Patent
Kelsey et al.

(10) Patent No.: US 8,163,323 B2
(45) Date of Patent: Apr. 24, 2012

(54) BAKING SYSTEM AND PROCESS WITH INTERMEDIATE PROOFING

(75) Inventors: Peter Kelsey, Minneapolis, MN (US); Jürgen Ullrich, Arnstein-Gänheim (DE)

(73) Assignee: New French Bakery, Inc., Minneapolis, MN (US)

( * ) Notice: Subject to any disclaimer, the term of this patent is extended or adjusted under 35 U.S.C. 154(b) by 987 days.

(21) Appl. No.: 11/837,307

(22) Filed: Aug. 10, 2007

(65) Prior Publication Data

US 2009/0041892 A1 Feb. 12, 2009

(51) Int. Cl.
*A21D 6/00* (2006.01)
(52) U.S. Cl. ............ 426/496; 426/7; 426/549; 426/391; 426/503; 426/504; 426/512
(58) Field of Classification Search .................. 426/446, 426/496, 28, 7, 549, 391, 439, 503, 504, 426/512; 425/238, 404, 440, 89; 249/127
See application file for complete search history.

(56) References Cited

U.S. PATENT DOCUMENTS

| | | |
|---|---|---|
| 1,214,302 A | 1/1917 | Hamilton |
| 1,319,189 A | 10/1919 | Taggart |
| 1,382,610 A | 6/1921 | Streich |
| 1,656,890 A | 1/1928 | Schiff |
| 1,899,246 A | 2/1933 | Schiff |
| 2,017,046 A | 10/1935 | Hanna et al. |
| 2,104,431 A | 1/1938 | Marasso |
| 3,900,570 A * | 8/1975 | Stigler ............................ 426/9 |
| 4,072,762 A * | 2/1978 | Rhodes ........................ 426/510 |
| 4,565,277 A | 1/1986 | Benier |
| 4,735,566 A | 4/1988 | Squicciarini |
| 4,904,491 A | 2/1990 | Morikawa et al. |
| 5,147,669 A * | 9/1992 | Crothers ........................ 426/94 |
| 5,935,629 A * | 8/1999 | Martin ........................ 426/231 |
| 6,117,472 A | 9/2000 | Yonemaru et al. |
| 6,524,090 B1 | 2/2003 | Hayashi et al. |

(Continued)

FOREIGN PATENT DOCUMENTS

DE 10130576 9/2002

(Continued)

OTHER PUBLICATIONS

Artisan Breads NPL, http://foodiefarmgirl.blogspot.com/2005/07/ten-tips-for-better-bread.html, Jul. 16, 2005.*

(Continued)

*Primary Examiner* — Drew Becker
*Assistant Examiner* — Preston Smith
(74) *Attorney, Agent, or Firm* — Faegre Baker Daniels LLP (57) ABSTRACT

A method for preparing bread includes forming a dough billet and providing a frame including a sling of flexible cloth material secured between two cross members, the sling defining an elongate trough sized to receive the dough billet. The dough billet is disposed in the elongate trough such that the dough billet has a predetermined orientation and the dough billet is moved into a cutting station using a conveyor. The dough billet is scored in the sling at the predetermined orientation with an automated cutting station. The dough billet is removed from the elongate trough by raising the dough billet by pressing a contact element against a bottom of the sling and taking the raised dough billet from the frame. The dough billet is also cooked on an oven floor.

9 Claims, 7 Drawing Sheets

U.S. PATENT DOCUMENTS

| | | | |
|---|---|---|---|
| 6,685,457 | B2 | 2/2004 | Hayashi et al. |
| 6,800,313 | B2 | 10/2004 | Hayashi et al. |
| 7,205,017 | B2 | 4/2007 | Hayashi et al. |
| 2003/0049359 | A1* | 3/2003 | Kulkarni et al. ............. 426/551 |
| 2003/0124234 | A1 | 7/2003 | Hayashi et al. |
| 2004/0009253 | A1 | 1/2004 | Hayashi et al. |
| 2004/0241301 | A1 | 12/2004 | Hayashi et al. |

FOREIGN PATENT DOCUMENTS

| | | |
|---|---|---|
| DE | 203119503 U1 | 6/2004 |
| DE | 202005002878 U | 10/2005 |
| EP | 0920805 A2 | 6/1999 |
| EP | 0920805 A3 | 6/1999 |
| EP | 0920805 B1 | 6/1999 |
| EP | 1174032 A1 | 1/2002 |
| JP | 2000-57723 | 2/2000 |
| WO | WO2004/021793 A1 | 3/2004 |

OTHER PUBLICATIONS

Newsletter: "Hot Shots Cool Notes", Kemper Horstmann, Apr. 17, 2006, 4 pages.

Article from foodproductdesign.com web site entitled "Artisan Breads" posted Feb. 1999, 7 pages.

Article from rheon.com web site entitled "Dough Sheet Equipment" 7 pages.

Article from rheon.com web site entitled Rheon Spirit, 5 pages.

Article from cafemeetingplace.com web site entitled Pre-ferments (part one) by Didier Rosada, dated Mar./Apr. 2004, 9 pages.

Article: Except from "The Handbook of Dough Fermentations" by Karel Kulp and Klaus J. Lorenz, pp. 129-130.

CD, Exhibit 1, Video of flipping system at a proofer exit, available prior to Jul. 27, 2007.

* cited by examiner

BAKING SYSTEM AND PROCESS WITH INTERMEDIATE PROOFING

BACKGROUND

The present invention generally relates to systems and methods of bread making, and more particularly to systems and methods for making baguette-style breads.

The traditional baguette made by hand is characterized by a hard crust of a rich, dark caramel color and a cream-colored inside formed by large irregular cells, or holes in the baguette's internal cell structure, which has a moist and chewy texture. The baguette is generally recognized as originating from Vienna some time in the mid-19th century after the introduction of steam ovens, which helped provide the characteristic hard crust and internal cell structure commonly associated with the French baguette.

In the modern age, bakers have turned to automation of various stages of the bread making processes in order to help manufacture breads in greater quantities. However, the use of industrial baking equipment has been faulted for failing to more closely match the visual and taste characteristics of a traditional baguette. In particular, bread dough is difficult to divide and mold into the elongate, thin shape needed for the traditional French baguette, for example.

According to some techniques, during formation of the dough into the elongate cylinders, or billets, the dough is mechanically stressed, damaging the protein structure established during fermentation of the dough and causing fermentation gases to escape from the dough. This reduces the water retaining capability of the dough and generally negatively impacts the cell structure, taste, and texture of bread baked from the dough.

In order to allow the protein structure to re-establish itself following mechanical stressing, some bread makers have employed one or more proofing, or resting steps during or following bread formation. In lieu of proofing, other bread makers have proposed various stress-free methods of molding and dividing dough to replace the proofing steps. For example, U.S. Pat. No. 6,117,472 describes a stress-free method of forming dough and the elimination of intermediate and final fermentation steps. These conflicting approaches to fermentation, or proofing, and the use of various methods of forming, leave room for improvement in making breads of superior quality.

SUMMARY

Some aspects of various embodiments relate to a system for preparing baguette-style bread. The system includes a make-up line for automatically forming a plurality of elongate dough billets and a frame including a plurality of cross members and a sling of flexible cloth material secured between two of the plurality of cross members. The sling has a bottom surface and an upper surface, the upper surface defining a trough for longitudinally receiving at least one of the dough billets. The system also includes a scoring station for automatically scoring the dough billet as received in elongate trough and a product transfer station for automatically transferring the dough billet from the frame to an oven. The product transfer station includes an elevator including a plurality of contact elements for abutting the bottom surfaces of the sling to cause the dough billet to move upwardly from a first height to a second height. The product transfer station also includes a transport for removing the dough billet from the frame after the dough billet is raised to the second height.

Other aspects of various embodiments relate to a method for preparing bread. The method includes forming a dough billet and providing a frame including a sling of flexible cloth material secured between two cross members, the sling defining an elongate trough sized to receive the dough billet. The dough billet is disposed in the elongate trough such that the dough billet has a predetermined orientation and the dough billet is moved into a cutting station using a conveyor. The dough billet is scored in the sling at the predetermined orientation with an automated cutting station. The dough billet is removed from the elongate trough by raising the dough billet by pressing a contact element against a bottom of the sling and taking the raised dough billet from the frame. The dough billet is also cooked on an oven floor.

Still other aspects of various embodiments relate to a method for preparing a baguette-style loaf of bread. The method includes mixing a dough sponge at a mixing station using flour, water, and yeast; fermenting the dough sponge; mixing a partial dough from the dough sponge including adding flour and water to the dough sponge; resting the partial dough; finally mixing a dough from the partial dough including adding salt, enzymes, and ascorbic acid to the partial dough; resting the dough; and stress-free forming the dough into at least one elongate dough billet. Stress-free forming the dough includes forming the dough into a band, dividing the band of dough into a plurality of dough pieces, and molding at least one of the dough pieces into an elongate dough billet. The method also includes intermediate proofing the dough billet and forming the dough billet after intermediate proofing. Forming the dough billet after intermediate proofing includes pressing the dough billet to a longer dimension.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Figure 1:
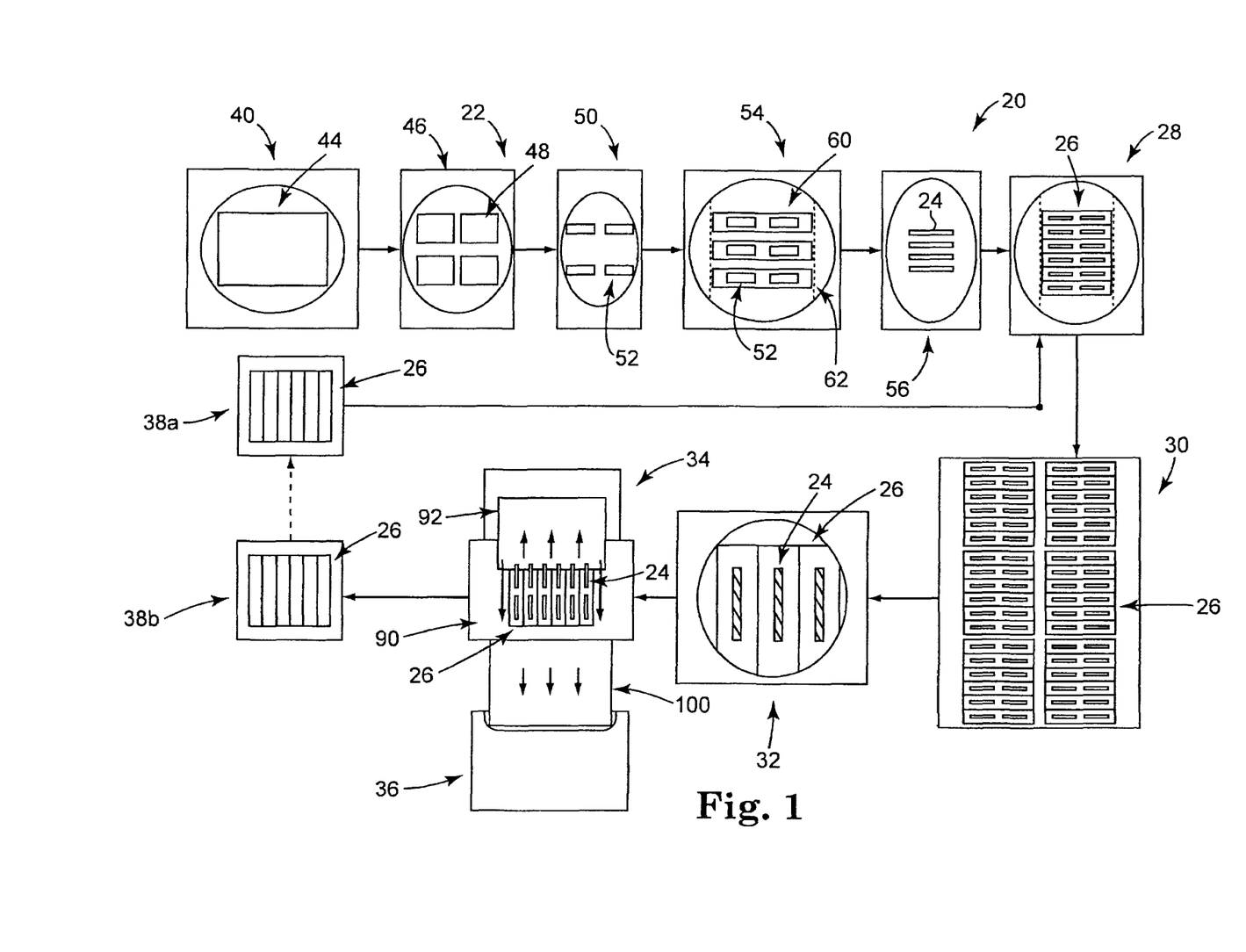
FIG. 1 is a schematic view of a system for preparing bread according to embodiments of the invention.

FIG. 1 is a schematic of a system 20 for preparing bread, such as baguette-style breads, which include traditional baguettes and batards. The system 20 includes a make-up line 22 for automatically forming a plurality of formed dough billets 24, a plurality of frames 26, a frame loading station 28 after the make-up line 22 for loading the dough billets 24 into the frames 28, a proofing station 30 for proofing the dough billets 24, a scoring station 32 for scoring the dough billets 24 in the frames 26, and a product transfer station 34 for automatically transferring the dough billets 24 from the frames 26 to an oven 36. The system 20 also optionally includes frame loading and unloading stations 38a, 38b, although stations 38a, 28b are optionally replaced by a continuous loop as desired.

Typically, mixers (not shown) and other suitable equipment are used to form a dough sponge, and then the dough that is fermented and ultimately used to prepare baguette-style bread, for example. In some embodiments, the fermented dough is placed into a hopper (not shown) associated with the make-up line 22 which feeds the fermented dough into the make-up line 22.

The make-up line 22 includes a banding, or sheeting station 40 for initially molding a band, or sheet of dough 44; a dividing station 46 after the sheeting station 40 for dividing the sheet of dough 44 into a plurality of dough pieces 48; a molding station 50 after the banding station 40 for forming the plurality of dough pieces 48 into a plurality of cylindrical dough billets 52 at an initial size; an intermediate proofing station 54 after the molding station 50 for proofing the dough billets 52; and a final molding station 56 after the intermediate proofing station 54 for pressing and rolling the dough billets 52 into the longer, formed dough billets 24.

The sheeting station 40 is adapted to minimize mechanical damage or stress on the fermented dough, also described as "stress-free" molding or forming, according to some embodiments. For example, in some embodiments, opposed rollers (not shown) are used at controlled speeds to form the dough fed into the make-up line 22 into the dough sheet 44 by stretching and molding the dough without substantially damaging the protein cell structure, i.e., without substantially stressing the dough, which would otherwise reduce the elasticity and water retaining capabilities of the dough that are provided during fermentation of the dough.

Examples of acceptable stress-free sheeting methods are described in U.S. Pat. No. 6,117,472 to Yonemaru et al. and U.S. Pat. No. 6,800,313 to Hayashi et al. One type of acceptable sheeting station is available from RHEON Automatic Machinery of Utsunomiya, Japan, with equipment sold under the trade name "V4 Artisan Bread Line" with the "STRESS FREE System." Other acceptable sheeting stations are available from FRITSCH GmbH of Bahnhofstrasse, Germany, including those associated with products sold under the trade name, "FRITSCH Special Bread Lines SBL." Still other suitable sheeting stations are available from Seewer ("Rondo Doge") of Burgdorf, Switzerland and Rademaker BV of Culemborg, Netherlands.

In some embodiments, the dividing station 46 is also adapted to minimize mechanical stress on the dough sheet 44 as it is divided into the dough pieces 48. One example of acceptable stress free dividing methods are described in U.S. Pat. No. 6,800,313 to Hayashi et al. One type of acceptable dividing station is available from RHEON Automatic Machinery of Utsunomiya, Japan, sold under the trade name "Model: VX121 STRESS FREE Divider." Other acceptable dividing stations are available from FRITSCH GmbH of Bahnhofstrasse, Germany, including those associated with products sold under the trade name, "FRITSCH Special Bread Lines SBL."

The molding station 50 is adapted to form the dough pieces 48 into the dough billets 52, each having an initial size. In some embodiments, the dough pieces 48 are formed into the dough billets 52 using a flexible blade cutter (not shown) and a curling unit (not shown), such as those available from RHEON Automatic Machinery of Utsunomiya, Japan. Other acceptable molding stations are available from FRITSCH GmbH of Bahnhofstrasse, Germany, including those associated with products sold under the trade name, "FRITSCH Special Bread Lines SBL."

The intermediate proofing station 54 includes a plurality of elongate buckets 60 secured to a pair of chains 62 or other conveyor means for transporting the buckets 60 along a proofing path. In some embodiments, the intermediate proofing station is an overhead proofer. The molding station includes a conveyor (not shown) or other appropriate means for depositing the dough billets 52 in the buckets 60 as desired. The dough billets 52 are held for some rest period, or proofed, in the intermediate proofing station 54. In some embodiments, the speed of the chains 62 and length of the path are selected to cause the dough billets 52 to rest, or proof, in the buckets 60 for a desired residence time in the proofing station 54. In some embodiments, two of the dough billets 52 are deposited in each bucket 60, although a variety of configurations are contemplated.

Figure 2:
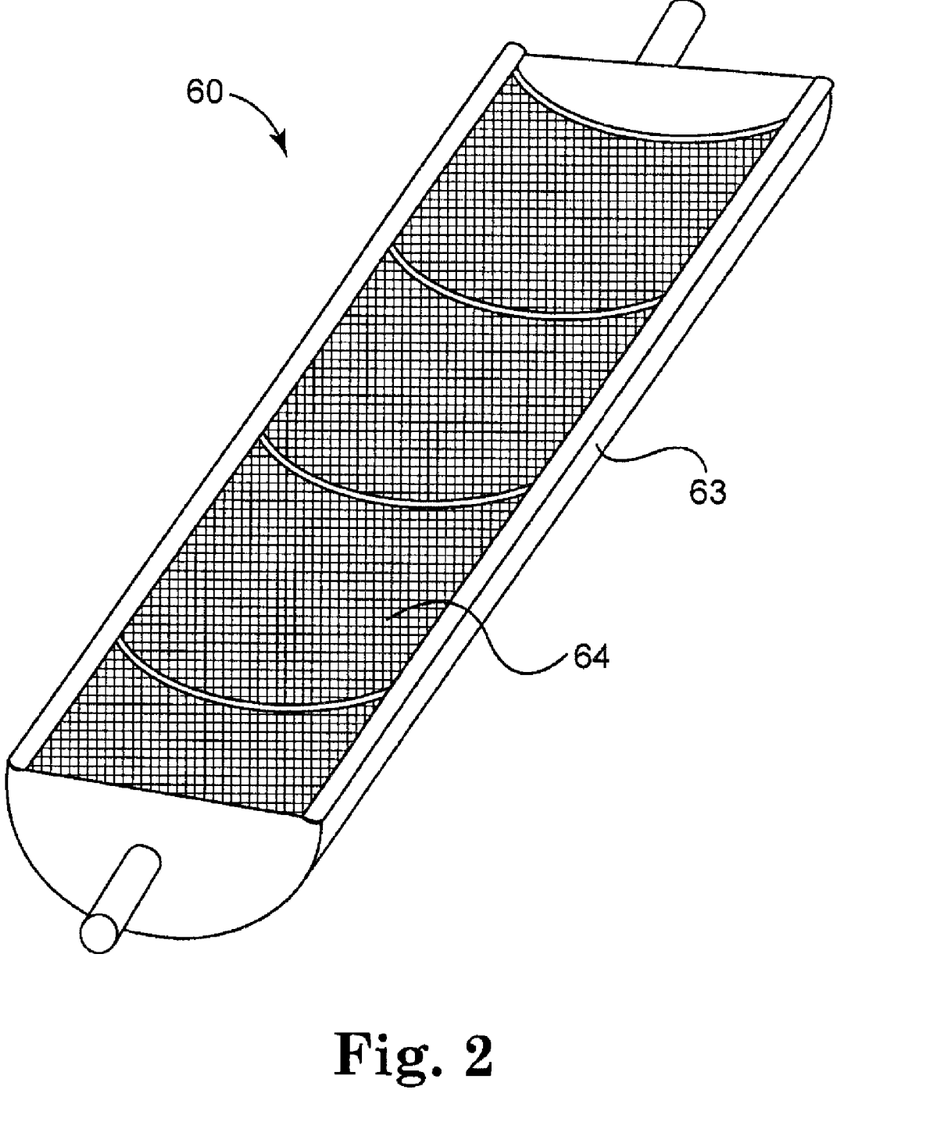
FIG. 2 is a cross-sectional view of a bucket according to embodiments of the invention.

FIG. 2 is an isometric view of one of the plurality of buckets 60. Each of the buckets 60 forms a trough for carrying the dough billets 52. In some embodiments, the buckets include a plastic molded frame 63 supporting a plastic screen 64 defining a substantially C-shaped, or sling-shaped, transverse cross-section. The shape of the trough, as opposed to a flat board or conveyor, for example, helps reduce flattening of the dough billets 52 over time as well as improve water and/or fermentation gas retention in the billets 52 during proofing. The buckets 60 are conveyed on the chains 62 or other suitable conveyor system and are automatically turned over at the end of the intermediate proofing station 54 to deposit the plurality of billets 52 onto a conveyor (not shown), or other appropriate transportation means feeding into the final molding station 56.

The final molding station 56 (FIG. 1) includes a press plate (not shown), roller (not shown), or other appropriate means for lengthening the billets 52 into the finally formed dough billets 24. In some embodiments, the roller is adapted to cause the billets 52 to elongate under pressure without introducing a substantial amount of mechanical stress into the dough according to a stress-free final molding operation. Suitable press plates and/or rollers for accomplishing final forming are available from RHEON Automatic Machinery of Utsunomiya, Japan. Other acceptable sheeting stations are available from FRITSCH GmbH of Bahnhofstrasse, Germany, including those associated with products sold under the trade name, "FRITSCH Special Bread Lines SBL."

As shown generally in FIG. 1, at the end of the final molding station 56, the formed dough billets 24 are deposited into the plurality of frames 26 at the frame loading station 28. The frame loading station 28 includes suitable conveyors (not shown) for moving the frames 26 and an associated stop mechanism or other means for holding one of the frames 26 in place until it has been loaded with the dough billets 24. In particular, the plurality of dough billets 24 are transported from the final molding station 56 on a belt conveyor and then deposited into one of the frames 26 off of the belt conveyor. In some embodiments, the dough billets 24 are deposited in the frames at a generally known lateral position within the frame 26, which, as subsequently described in greater, facilitates scoring of the dough billets 24.

Figure 3:
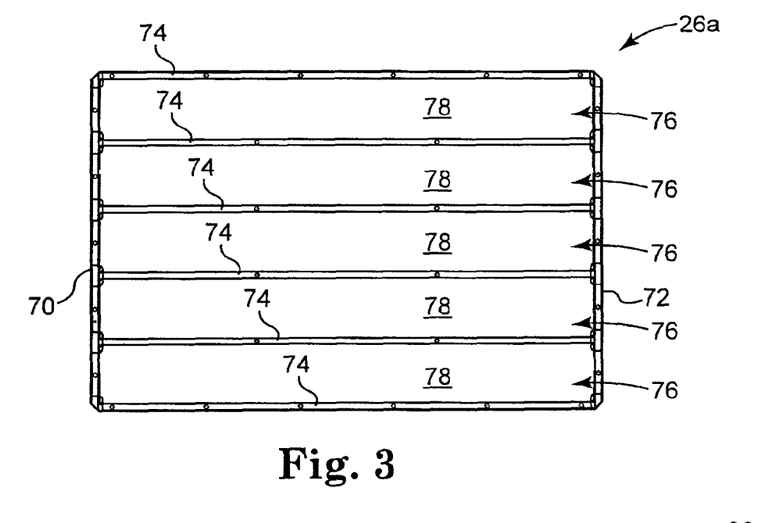
FIG. 3 is a plan view of a rack according to embodiments of the invention.

In some embodiments, three of the billets 24 are disposed lengthwise in a single row within each of the frames 26, although any variety of configurations are contemplated, for example two-by-two as shown in FIG. 1. One of the frames 26a, which is optionally substantially similar to each of the frames 26, is shown and described in greater detail with reference to FIGS. 3 and 4. As shown, the frame 26a includes two opposing end members 70, 72 and a plurality of cross members 74, the end members 70, 72 and cross members 74 combining to define a plurality of rectangular pockets 76, or rows 76. Any number of cross members 74 and corresponding pockets 76 are contemplated, such as six cross members 74 and five pockets 76 or eight cross members 74 and seven pockets 76, for example. The frame 26a also includes a flexible material secured to the cross members to define a plurality of slings 78 corresponding to each of the pockets 76.

Figure 4:
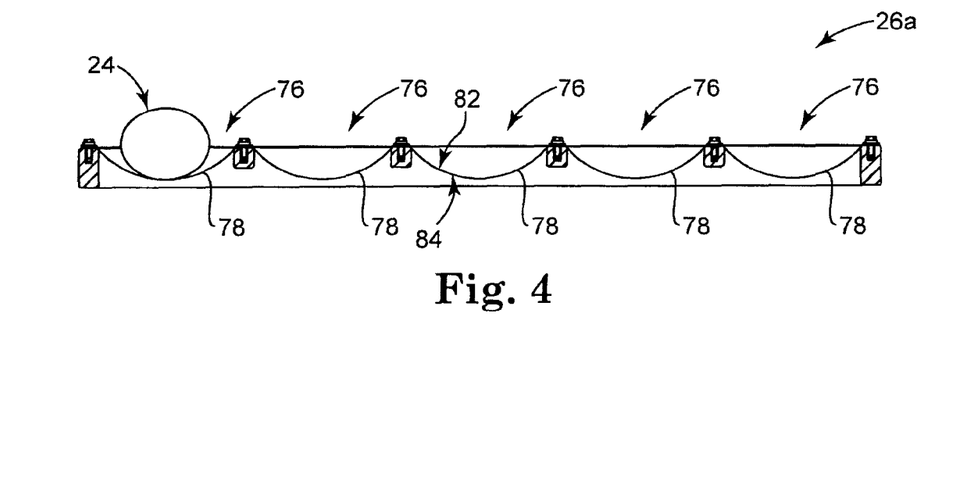
FIG. 4 is a cross-sectional view of the rack of FIG. 3.

As shown in FIG. 4, the slings 78 are trough-shaped and hang downwardly relative to the cross members 74 and end members 70, 72, each defining an upper surface 82 and a bottom surface 84. The slings 78 define a substantially U-shaped, or C-shaped transverse profile. As shown, the upper surface 82 is used to support the billets 24 maintained in the frame 26a. The shape of the slings 78 helps reduce flattening of the dough billets 24 (only one billet 24 is shown in FIG. 4) over time as the billets 24 undergo proofing, as well as improve water and/or fermentation gas retention in the billets 24, as opposed to proofing on a flat board or conveyor, for example.

The end members 70, 72 and cross members 74 are made of a metal or plastic material, for example, such as aluminum or stainless steel. In turn, the slings 78 are optionally made of canvas, linen, or sail cloth. As will be described in greater detail below, it has been surprisingly discovered that Dacron sailcloth works particularly well for allowing the slings 78 and the billets 24 maintained therein to be pressed upwardly between the cross members 74 without the slings "popping" or "snapping" upwardly, which can otherwise occur due to elasticity of the flexible material, such as rubberized cloth or sheet plastic materials, for example.

With reference to FIG. 1, the proofing station 30 includes chains (not shown) or other appropriate transport means for transporting the frames 26 into a proofing environment (not shown). For example, the frames 26 are optionally continuously moved by the transport means for a desired residence time in the proofing station 30. In other embodiments, the frames 26 are transported to a desired location in the proofing environment where they are stored for the desired residence time and then later transported by the transportation means to the scoring station 32. Examples of suitable proofing stations are available from Bamak Company of Mori, Italy.

Figure 5:
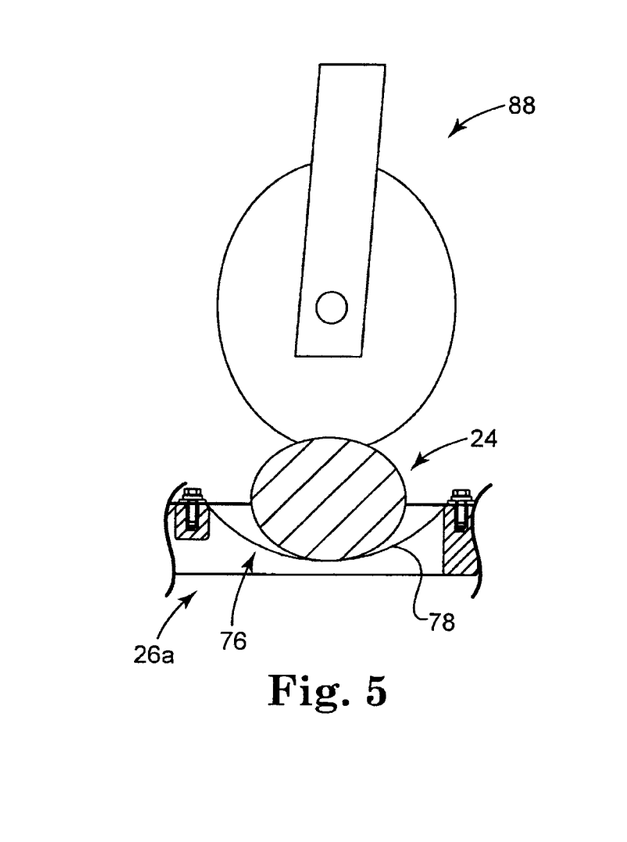
FIG. 5 is a schematic view of a cutting arm and rack according to embodiments of the invention.
Figure 6:
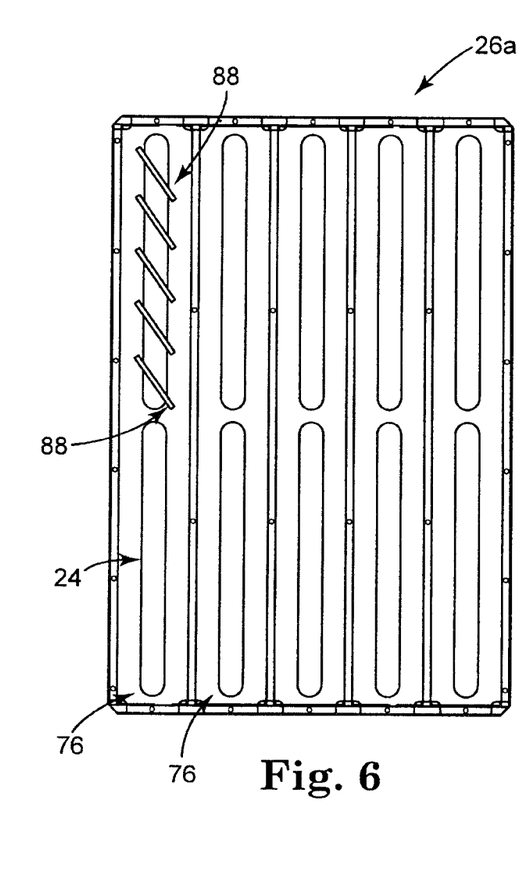
FIG. 6 is a is a plan view of cutting arms and the rack of FIG. 5.

The scoring station 32 includes one or more cutting means, such as one or more blade arms 88 shown in FIGS. 5 and 6. As shown in FIG. 5, the blade arms 88 can include circular rotating blades, although stationary blades or other type of blades are also contemplated. For example, octagonal-shaped blades are also contemplated. The blades 88 can be actuated via servos (not shown), air cylinders (not shown), and an appropriate controller. Generally, the blade arms 88 are actuated back and forth to score the surfaces of each of the billets 24 with a diagonal score line where the score lines are adapted to help facilitate expansion of the billets 24 during baking.

As shown generally in FIG. 6, a desired number of score lines, five for example, are formed in the top of each of the billets 24. In one embodiment, five blade arms 88 are adapted to automatically score the surface of each of the billets 24, although any number of blade arms 88 can be used. The frames 26 help maintain the billets 24 at a known angular, lateral, and longitudinal position within the slings 78. In particular, the trough shape causes the billets 24 to be disposed substantially longitudinally within the slings 78 and centered relative to the pockets 76.

Once the position of the frame 26 is generally known relative to the blade arms 88, the position of each of the billets 24 within the pockets 76 will also be generally known, allowing for relatively accurate scoring of the billets 24 and reducing the need for manual alignment of the billets 24 to the blade arms 88 at the scoring station 32. In some embodiments, the position of the frame 26 is detected using optical means, such as a laser (not shown). In other embodiments, the frame 26 is abutted against a switch sensor or stop (not shown) when it is transported into the scoring station 32 providing a known position of the frame 26. In other embodiments, the position of each of the billets 24 is detected directly, using an optical inspection and vision detection system (not shown) for example.

Figure 7:
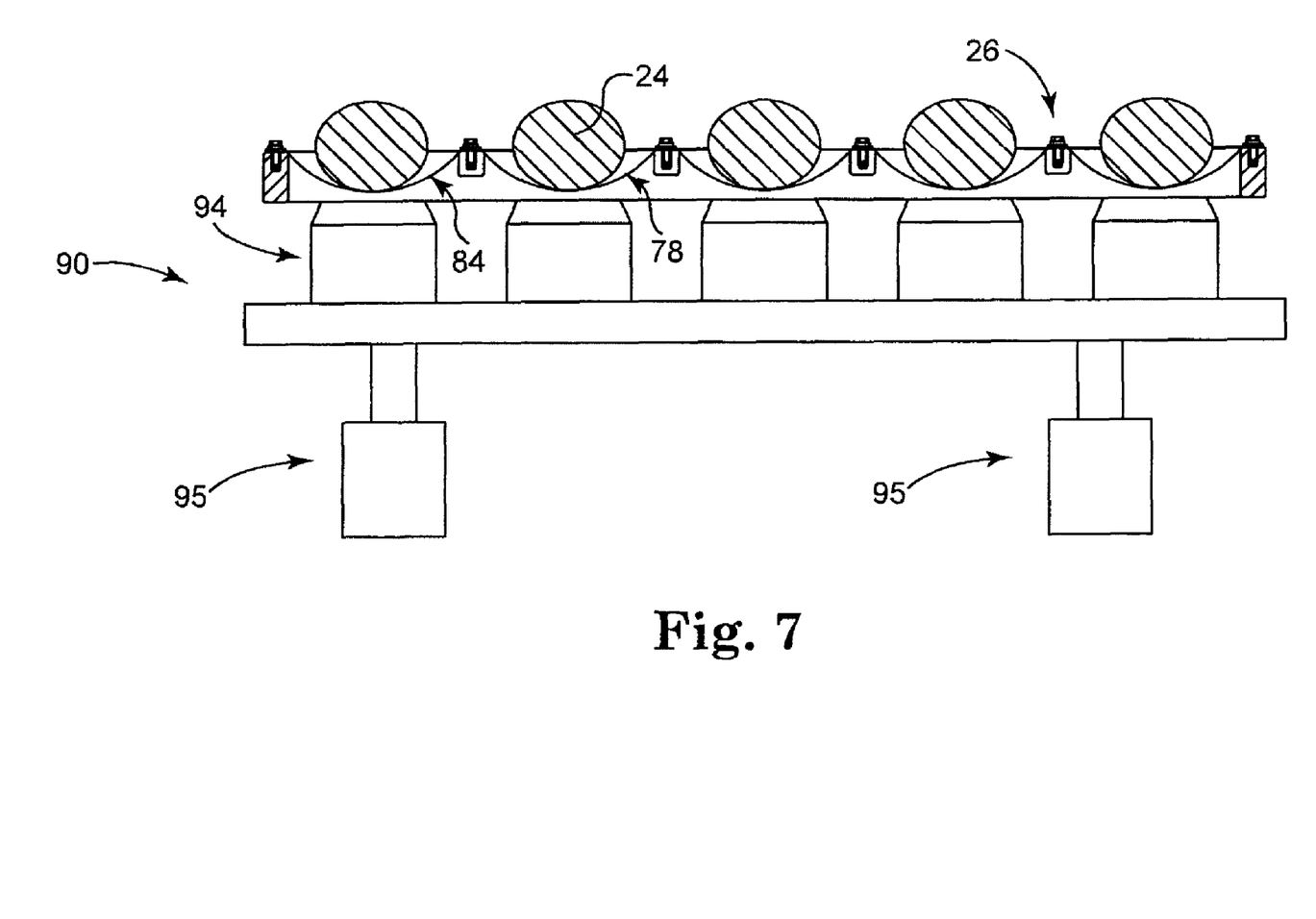
FIG. 7 is a schematic view of a rack and elevator according to embodiments of the invention.
Figure 8:
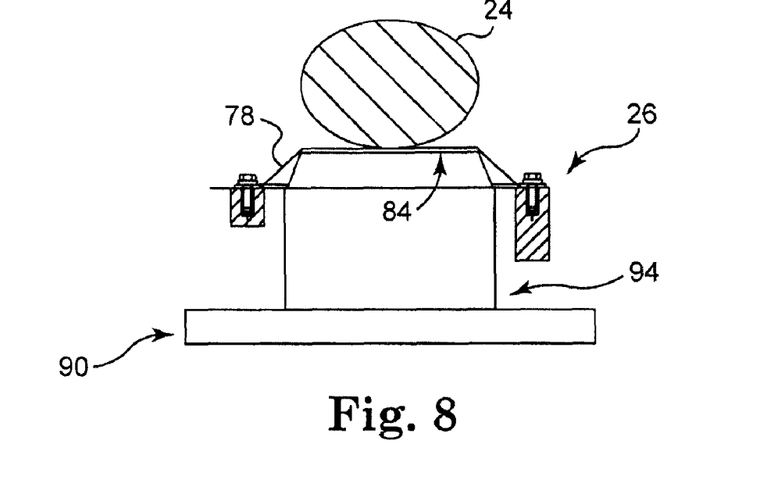
FIG. 8 is an enlarged view of a portion of the rack and elevator of FIG. 7.

As shown generally in FIG. 1, the product transfer station 34 includes an elevator 90 and a transport 92. As shown in FIG. 7, the elevator 90 includes a plurality of contact elements 94 that move upwardly to abut the bottom surfaces 84 of the slings 78 to cause dough billets 24 maintained in the frames 26 to move upwardly from a first height (FIG. 7) to a second height (FIG. 8). In some embodiments, the heads of the contact elements are substantially trapezoidal shaped as shown and include substantially flat upper surfaces. The elevator 90 optionally includes pneumatic or hydraulic cylinders, servos, or other means 95 for vertically actuating the contact elements 94. As alluded to, FIG. 8 shows one of the contact elements 94 at the second height and pressed against the bottom surface 84 of one of the slings 78 to raise one of the dough billets 24 to the second height for removal from an associated one of the frames 26. The remaining frames 26 are similarly handled according to various embodiments.

Figure 9:
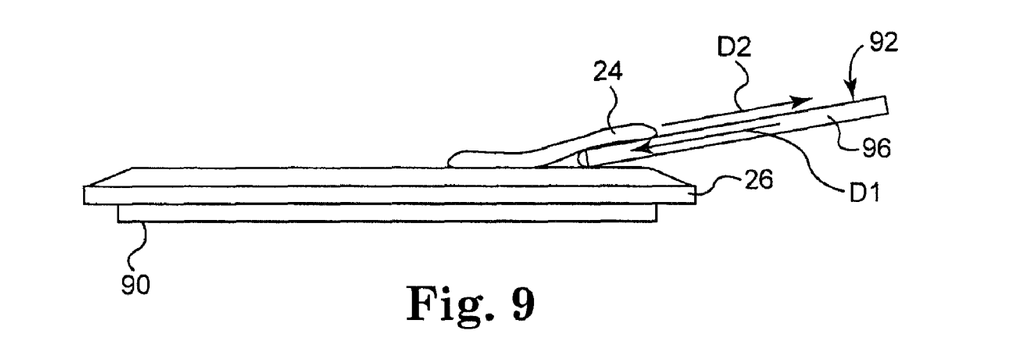
FIG. 9 is a schematic view of a product transfer station according to embodiments of the invention.

As shown in FIG. 9, the transport 92 includes a conveyor 96 that is moved in a first direction D1 to engage the dough billets 24. Once the conveyor 96 is contacting the dough billets 24, the conveyor 96 is actuated in a second direction D2 to pull the dough billets 24 onto the conveyor 96. In particular, by raising the dough billets 24 to the second height, the transport 92 is better able to engage and remove the dough billets 24 from the frames 26. The transport 92 is also adapted to move further in the first direction D1 to move the dough billets 24 to the oven 36 (FIG. 1). The conveyor 96 is then actuated opposite the second direction D2 (i.e., it is reversed) to deposit the dough billets 24 on an oven conveyor 100 into the oven.

As shown in FIG. 1, the oven 36 includes the associated conveyor 100 for receiving the dough billets 24 from the transport 92. The oven is optionally steam-injected and a hearth-style oven, where the dough billets 24 are baked on a steel band conveyor or other appropriate hearth-style oven surface within the oven 66.

Once the dough billets 24 have been removed from their associated frames 26, the frames 26 are conveyed (e.g., using a chain conveyor system) to the frame unloading station 38b where the frames 26 are optionally inspected, cleaned and/or prepped for further use (e.g., dusting with corn meal). The frames 26 then proceed automatically to the loading station 38a to continue back through the system 20.

Figure 10:
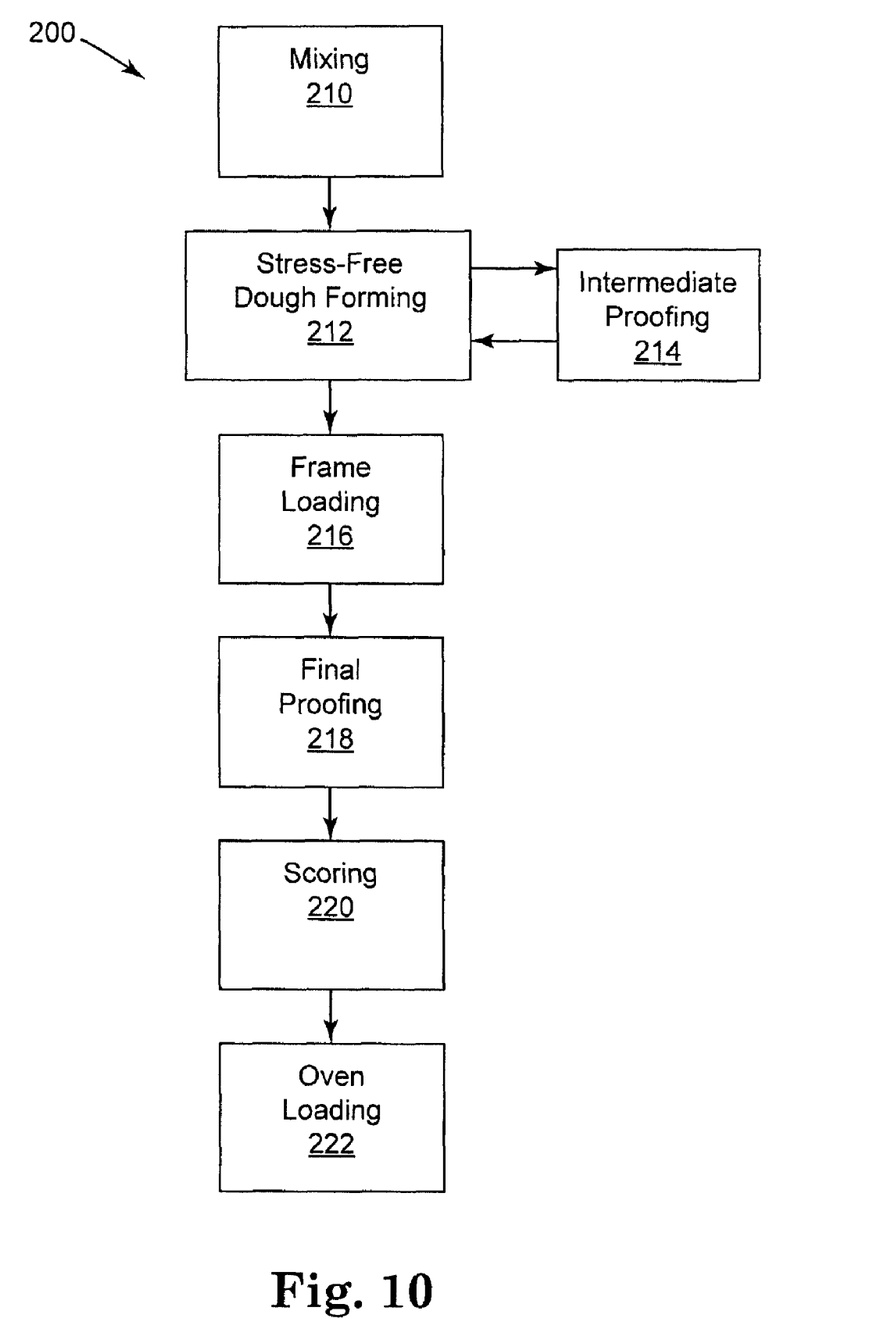
FIG. 10 is a schematic view illustrating a method of making baguette-style bread according to embodiments of the invention.

A method 200 of making bread, such as baguette-style bread, in view of the foregoing is illustrated schematically in FIG. 10. As shown, the method 200 includes a mixing process 210, a stress-free dough forming process 212, an intermediate proofing process 214, a frame loading process 216, a proofing process 218, a scoring process 220, and an oven loading process 222.

The mixing process 210 includes mixing a dough sponge, fermenting the dough sponge, mixing a partial dough from the dough sponge, resting the partial dough, finally mixing a dough from the partial dough, and resting the dough.

In some embodiments, mixing the dough sponge includes mixing flour, water, and yeast at desired ratios, such as about 100:100:0.001, for example. The dough sponge is then fermented in ambient conditions for a desired time, such as about eight hours. The partial dough is mixed from the dough sponge following fermentation. In some embodiments, mixing the partial dough from the dough sponge includes adding flour and water to the sponge, until the flour, water, and sponge are at a desired ratio, such as about 100:54:100, for example. The final mixing of dough includes adding salt, enzymes, and ascorbic acid. The dough is then allowed to rest for about 1.5 hours, for example, in a room environment.

The stress-free dough forming process 210 includes initially molding the band, or sheet of dough 44; dividing the sheet of dough 44 into the plurality of dough pieces 48; forming the plurality of dough pieces 48 into the plurality of cylindrical dough billets 52 at their initial sizes; and finally molding the dough billets 52 by pressing the dough billets 52 into the longer, formed dough billets 24.

As shown in FIG. 10, the intermediate proofing process 214 optionally proceeds after forming the plurality of dough pieces 48 and prior to molding the dough billets 52 into the formed dough billets 24. In some embodiments, the intermediate proofing process 214 includes proofing the dough billets 52 at room conditions from about 5 minutes and about 15 minutes, for about 10 minutes, or for some other desired time.

The frame loading process 216 includes loading the plurality of dough billets 24 into the frames 26, after which the dough billets 24 are proofed during the proofing process 218. In some embodiments, the proofing process 218 includes proofing the dough billets 24 in the proofing station 30 at room conditions from about 30 minutes to about 50 minutes, for about 45 minutes, or for some other desired time.

The scoring process 220 includes marking the top surfaces of the dough billets 24 with a desired number of score marks, or diagonal score lines, such as five for example. In some embodiments, the dough billets 24 are scored in the slings 78 at predetermined orientations with the automated cutting station, or scoring station 32, as previously described.

The oven loading process 222 includes abutting a plurality of contact elements against the bottom surfaces 84 of the slings 78 to cause the dough billets 24 to move upwardly from the first height to the second height. The product transfer station 34 is then used to remove the raised dough billets 24 from the frames 26 and deposit them in the oven 36. The dough billets 24 are then hearth baked, with steam injection, for example, as desired.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A method for preparing bread comprising:
    forming a formed dough billet;
    providing a frame including a sling of flexible cloth material secured between two cross members, the sling defining an elongate trough sized to receive the formed dough billet;
    disposing the formed dough billet in the elongate trough such that the formed dough billet has a predetermined orientation;
    moving the formed dough billet into a cutting station using a conveyor;
    scoring the formed dough billet in the sling at the predetermined orientation with an automated cutting station;
    removing the formed dough billet from the elongate trough by raising the formed dough billet by pressing a contact element against a bottom of the sling and taking the raised formed dough billet from the frame by contacting the formed dough billet with a conveyer; and
    cooking the formed dough billet on an oven floor.

2. The method of claim 1, wherein scoring the formed dough billet at the predetermined orientation with the cutting station further comprises making a plurality of diagonal score lines in a top surface of the formed dough billet.

3. The method of claim 1, wherein the dough billet is formed using a stress-free line and forming the dough billet comprises:
    mixing dough;
    initially forming the dough including dividing and pre-molding the dough into an elongate shape to form an initial dough billet;
    proofing the initial dough billet; and
    secondarily forming the initial dough billet after proofing into a formed dough billet, including pressing the initial dough billet.

4. The method of claim 1, wherein mixing the dough comprises:
    initially mixing a dough sponge;
    fermenting the dough sponge;
    intermediately mixing a partial dough from the dough sponge;
    resting the partial dough;
    finally mixing the dough from the partial dough; and
    resting the dough prior to dividing and pre-molding the dough.

5. The method of claim 1, wherein scoring of the formed dough billet further comprises determining a position of the sling relative to the cutting station to identify a known angular, lateral, and longitudinal position of the formed dough billet.

6. A method for preparing a baguette-style loaf of bread comprising:
    mixing a dough sponge at a mixing station using flour, water, and yeast;
    fermenting the dough sponge;
    mixing a partial dough from the dough sponge including adding flour and water to the dough sponge;
    resting the partial dough;
    finally mixing a dough from the partial dough including adding salt, enzymes, and ascorbic acid to the partial dough;
    resting the dough;
    stress-free forming the dough into at least one elongate initial dough billet, including forming the dough into a band, dividing the band of dough into a plurality of dough pieces, and molding at least one of the dough pieces into an elongate initial dough billet;

intermediate proofing the initial dough billet;

forming the initial dough billet into a formed dough billet after intermediate proofing, including pressing the initial dough billet to a longer dimension to form a formed dough billet;

disposing the formed dough billet in a frame including a sling of flexible cloth material secured between two cross members, the sling defining an elongate trough sized to receive the formed dough billet; and removing the formed dough billet from the elongate trough by raising the formed dough billet by pressing a contact element against a bottom of the sling and taking the raised formed dough billet from the frame by contacting the formed dough billet with a conveyer.

7. The method of claim 6, wherein the initial dough billet undergoes intermediate proofing from about 5 minutes to about 15 minutes.

8. The method of claim 6, wherein the initial dough billet undergoes intermediate proofing for at least about 10 minutes.

9. The method of claim 6, further comprising hearth baking the formed dough billet in a steam-injected oven to form a baguette-style loaf of bread.

* * * * *